United States Patent
Craig

(10) Patent No.: US 8,858,129 B2
(45) Date of Patent: Oct. 14, 2014

(54) SEGMENTED ORBITAL DRILL

(75) Inventor: Karen Anne Craig, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 862 days.

(21) Appl. No.: 13/034,139

(22) Filed: Feb. 24, 2011

(65) Prior Publication Data

US 2012/0219371 A1 Aug. 30, 2012

(51) Int. Cl.
*B23C 5/04* (2006.01)
*B23C 3/02* (2006.01)
*B23C 5/10* (2006.01)

(52) U.S. Cl.
CPC ... *B23C 3/02* (2013.01); *B23C 5/10* (2013.01); *B23C 2220/52* (2013.01); *B23C 2210/247* (2013.01); *B23C 2210/70* (2013.01); *B23C 2226/27* (2013.01)
USPC .................................. 407/55; 407/61; 407/30

(58) Field of Classification Search
CPC ............... B23C 5/04; B23C 2210/247; B23C 2210/248; B23C 2215/04; B23C 2220/52
USPC ............................. 407/55, 61, 62, 30, 53, 64
See application file for complete search history.

(56) References Cited

U.S. PATENT DOCUMENTS

| | | | | |
|---|---|---|---|---|
| 4,050,128 A | * | 9/1977 | Lange | 407/59 |
| 4,411,563 A | * | 10/1983 | Moon | 407/54 |
| 4,497,600 A | * | 2/1985 | Kishimoto | 407/53 |
| 6,257,810 B1 | * | 7/2001 | Schmitt | 409/66 |
| 6,517,427 B1 | | 2/2003 | Yoshikawa et al. | |
| 6,602,209 B2 | | 8/2003 | Lambert et al. | |
| 6,793,564 B1 | | 9/2004 | Lupi | |
| 7,313,882 B2 | | 1/2008 | Beretta | |
| 7,431,538 B1 | | 10/2008 | Ni et al. | |
| 7,544,021 B2 | * | 6/2009 | Flynn | 407/59 |
| 2006/0233623 A1 | * | 10/2006 | Andoh et al. | 409/66 |
| 2008/0069656 A1 | * | 3/2008 | Volokh | 409/200 |
| 2008/0193234 A1 | | 8/2008 | Davancens et al. | |
| 2009/0119932 A1 | | 5/2009 | Lau | |
| 2009/0185874 A1 | | 7/2009 | Liao | |
| 2010/0172703 A1 | * | 7/2010 | Neubold | 407/53 |

* cited by examiner

*Primary Examiner* — Andrea Wellington
*Assistant Examiner* — Ryan Rufo
(74) *Attorney, Agent, or Firm* — Larry R. Meenan, Esq.

(57) ABSTRACT

A segmented orbital drill includes a segmented portion with a semi-finishing cutting portion and a plurality of finishing cutting portions. The semi-finishing cutting portion and finishing cutting portions are separated by grooves formed by a front wall and a rear wall. The segmented portion allows for a fresh cutting edge (i.e., rear wall of the groove) to be revealed as the orbital drill wears in the axial direction. The segmented portion also causes less contact with the workpiece, which reduces power consumption and minimizes deflection of the orbital drill. The segmented orbital drill also includes an optional pilot at one end of the drill, and a clearance neck portion between a shank and the segmented portion. A method of machining a workpiece using the segmented orbital drill is also disclosed.

7 Claims, 3 Drawing Sheets

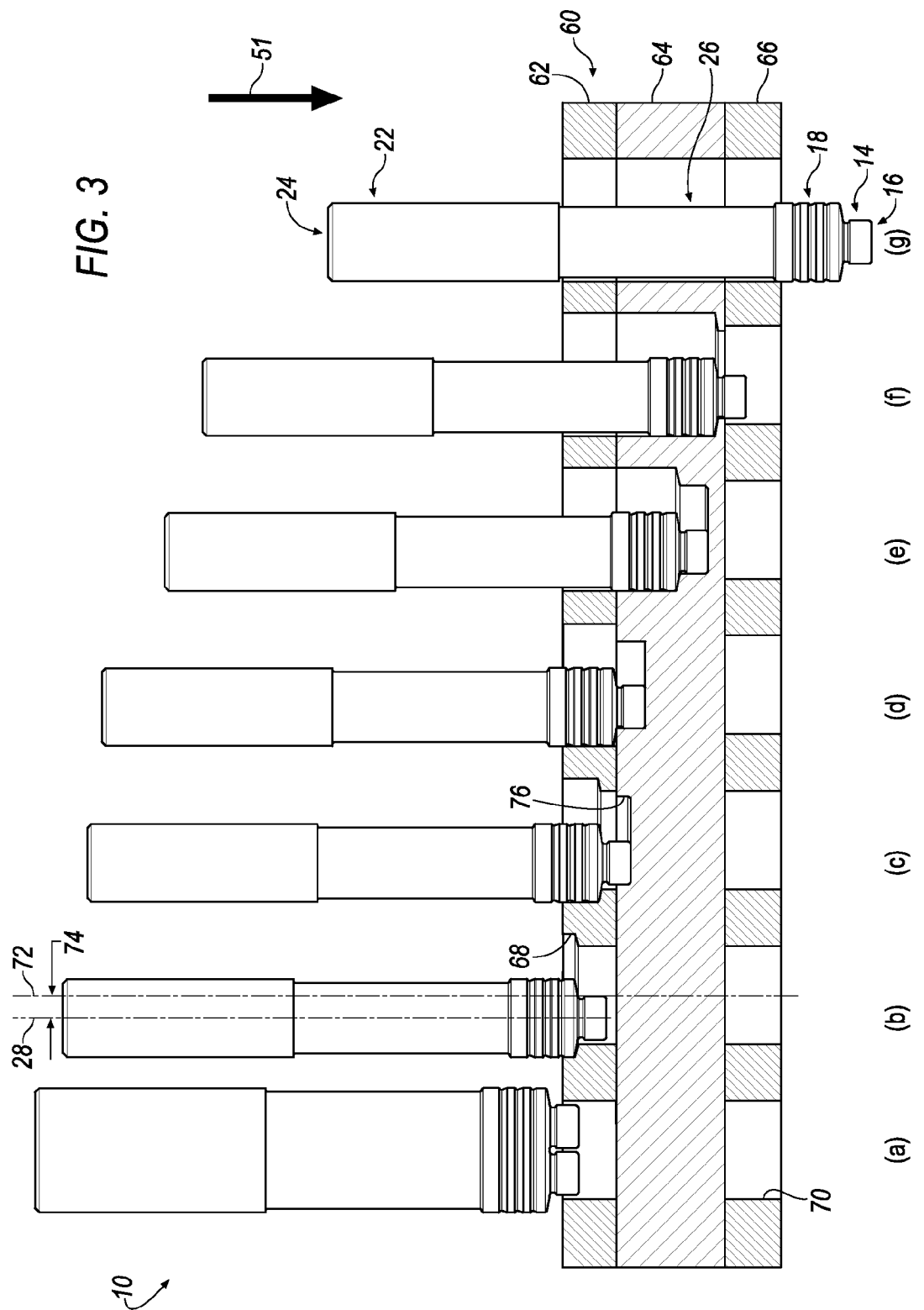

SEGMENTED ORBITAL DRILL

BACKGROUND OF THE INVENTION

Fiber reinforced plastic (FRP) materials are widely used in aerospace industry due to its high specific strength and high specific stiffness. FRP materials are composite materials consisting of soft resin matrix and high strength fiber reinforcement. Typical fiber reinforcements include carbon fibers (CFRP), glass fibers (GFRP), Kevlar fibers, and the like. FRP materials are often processed into a laminated structure. FRP materials have excellent in-plane strength, but low inter-laminar strength.

Multi-function end effectors, portable orbital machines and CNC machines produce orbital (helically interpolated) holes and/or conventionally drilled holes in composite stack materials.

The major issue of machining composite stack materials is the accelerated wear that occurs on the tool edges. Tool life is very poor, even with advanced substrates and coatings.

SUMMARY OF THE INVENTION

The problem of accelerated wear of tool edges when machining composite stack materials is solved by providing a segmented orbital drill that uses geometric shapes to increase tool life.

In one aspect, a segmented orbital drill comprises a segmented portion including a semi-finishing cutting portion and at least one finishing cutting portion, the semi-finishing cutting portion having a diameter that is different than a diameter of the at least one finishing cutting portion; and a clearance neck portion between the segmented portion and a shank.

In another aspect, a method of machining a workpiece using a segmented orbital drill comprising a pilot and segmented portion and a clearance neck portion between the segmented portion and a shank comprises drilling a hole in a first layer of material with the segmented portion of the segmented orbital drill; drilling a hole in a second layer of material with the pilot while drilling the hole in the first layer of material with the segmented portion until the segmented portion has drilled completely through the first layer of material; and drilling a hole in a third layer of material with the segmented portion without using the pilot until the segmented portion has drilled completely through the third layer of material.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIGS. 3(a)-(f) is an isomeric view of a method for machining a workpiece having having a top layer of CFRP material and a bottom layer of metal material using the cutting tool of the invention.

DETAILED DESCRIPTION OF THE INVENTION

Figure 1:
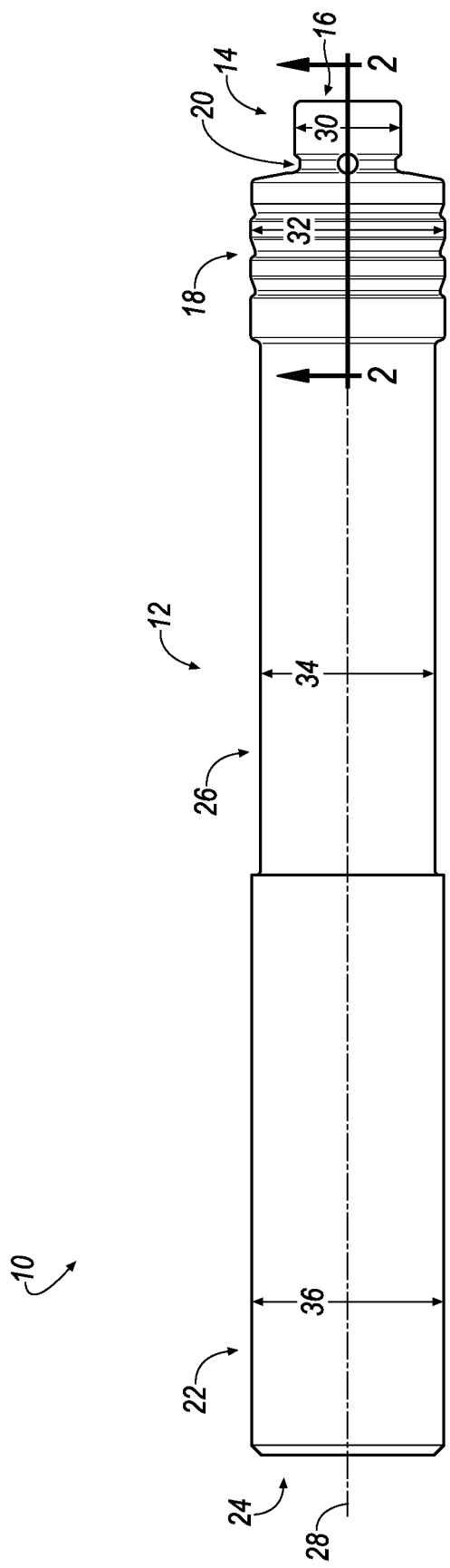
FIG. 1 is a plan view of an exemplary embodiment of a segmented orbital drill according to an embodiment of the invention.

Below are illustrations and explanations for a version of combination end milling drilling/push drilling cutting tool and a method for machining a workpiece. However, it is noted that combination cutting tool and machining method may be configured to suit the specific application and is not limited only to the example in the illustrations.

Referring to FIGS. 1-4, wherein like reference characters represent like elements, a segmented orbital drill for performing a machining operation on a workpiece is generally shown at 10. In one embodiment, the workpiece 60 (FIG. 3) is a composite stack material having a top layer, 62 a middle layer 64 and a bottom layer 66. The top and bottom layer 62, 66 may comprise, for example, a metal, such as titanium, and the like. The middle layer 64 may comprise a different material than the top and bottom layer 62, 66. For example, the middle layer 64 may comprise a carbon fiber reinforced plastic (CFRP) material, and the like. As used herein, "top" refers to the first material to be machined by the orbital drill 10, middle material refers to the second material to be machined by the orbital drill 10, and "bottom" refers to the third material to be machined by the orbital drill 10 during the machining operation.

In general, the orbital drill 10 includes a main body 12 and a pilot 14 at one end 16 of the orbital drill 10. The pilot 14 is optional, depending on the composite stack material to be machined by the orbital drill 10. In one example, the pilot 14 can be used as a first cutting portion to drill the layer 64 of CFRP material if present in the workpiece 60.

The orbital drill 10 also includes a segmented portion, shown generally at 18, with a plurality of cutting portions, and an undercut 20 between the pilot 14 and the segmented portion 18. The orbital drill 10 also includes a shank 22 at the other, opposite end 24. The orbital drill 10 also includes a clearance neck portion 26 between the segmented portion 18 and the shank 22. The purpose of the clearance neck portion 26 is to permit clearance of the orbital drill 10 during a machining operation. The clearance neck portion 26 is also where the chips are ejected. The clearance neck portion 26 is dimensioned in length to be greater than the entire thickness of the workpiece 60 (FIG. 3). The orbital drill 10 also includes a central, longitudinal axis 28 that extends the entire length of the orbital drill 10. Coolant holes 38 (FIG. 2) may be located in the vicinity of the pilot 14 to assist in cooling the orbital drill 10. The pilot 14, the segmented portion 18 and a portion of the clearance neck portion 22 of the orbital drill 10 can include one or more flutes (not shown) of a type well-known in the art for assisting in the removal of chips.

In general, the pilot 14 has a diameter 30 that is smaller than an overall diameter 32 of the segmented portion 18. The diameter 30 of the pilot 14, which is optional, is dimensioned for drilling the CFRP material in the workpiece 60, and is specific for a particular application. Various parameters for the diameter 30 include, but is not limited to, final hole size, the orbital offset, the diameter of the main body 12 of the drill 10, and the amount of composite stack material is to remain in the hole to be drilled.

The clearance neck portion 26 has a diameter 34 that is slightly smaller than the overall diameter 32 of segmented portion 18, but larger than the diameter 30 of the pilot 14. The overall diameter 32 of the segmented portion 18 of the orbital drill 10 is substantially equal to the final diameter of the hole 68 (FIG. 3) to be drilled by the orbital drill 10. In the illustrated embodiment, the shank 22 has a diameter 36 that is larger than the clearance neck portion 26 and the pilot 14, and approximately equal to the overall diameter 32 of the segmented portion 18. It will be appreciated that the invention is not limited by the specific diameter, and that the invention can be practiced with any desirable diameter, depending on the design parameters of the orbital drill 10.

Figure 2:
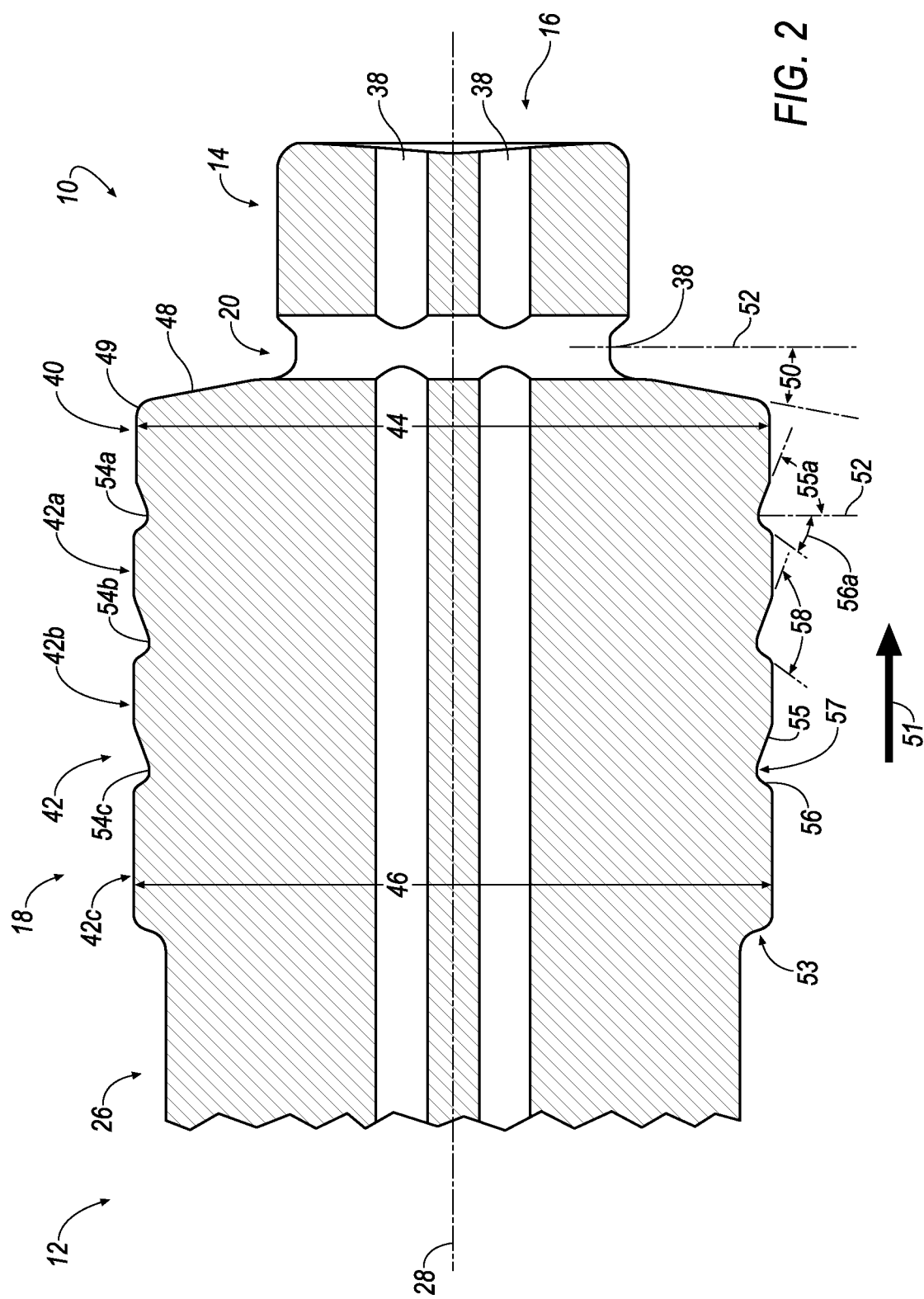
FIG. 2 is an enlarged cross-sectional view of the segmented portion of the orbital drill taken along line 2-2 of FIG. 1.

Referring now to FIG. 2, one aspect of the invention is that the segmented portion 18 of the orbital drill 10 includes a plurality of cutting portions. Specifically, the segmented portion 18 includes a semi-finishing cutting portion 40 and a plurality of finishing cutting portions 42. In the illustrated embodiment, the segmented portion 18 of the orbital drill 10 includes a total of three (3) finishing cutting portions 42. However, it will be appreciated that the invention is not limited by the number of finishing cutting portions 42, and that the invention can be practiced with any desirable number of finishing cutting portions 42, depending on the application of the orbital drill 10.

As mentioned above, the segmented portion 18 has an overall diameter 32. This is because the semi-finishing cutting portion 40 has a different diameter than the finishing cutting portions 42. Specifically, the semi-finishing cutting portion 40 has a diameter 44 that is slightly smaller than a diameter 46 of the finishing cutting portions 42. For example, the semi-finishing cutting portion 40 may have a diameter 44 of about 0.390 inches (9.9 mm) and the finishing cutting portions 42 may have a diameter 46 of about 0.394 inches (10.0 mm). The diameter 44 of the semi-finishing cutting portion 40 determines the size of the chips for the finishing cutting portions 42.

It will be appreciated that the invention is not limited by the relative diameters between of the semi-finishing cutting portion 40 and the finishing cutting portions 42, and that the invention can be practiced with any desirable relative diameter, depending on the application of the orbital drill 10. In addition, it will be appreciated that the invention is not limited to a single semi-finishing cutting portion 40, and that the invention can be practiced with any desirable number of semi-finishing cutting portions, depending on the application of the orbital drill 10. For example, the invention can be practiced with two or three semi-finishing cutting portions with each semi-finishing cutting portion have different diameters, which may be different than the diameter 46 of the finishing cutting portions 42.

The orbital drill 10 includes a tapered surface 48 between the pilot 14 and the segmented portion 18. The purpose of the tapered surface 48 is to allow the segmented portion 18 of the orbital drill 10 to easily enter the metal layer 66 of the workpiece 60 after a pilot hole is drilled in the CFRP material 64 by the pilot 14. In addition, the tapered surface 48 can be used for removing any burrs from the hole 68 of the workpiece 60 (FIG. 3) in a helical interpolation operation or a circular operation, if necessary. In the illustrated embodiment, the tapered surface 48 is formed at an angle 50 of approximately ten (10) degrees with respect to an axis 52 that is perpendicular to the longitudinal axis 28 of the orbital drill 10. However, it will be appreciated that the invention is not limited by the angle at which the tapered surface 48 is formed, and that the invention can be practiced with any desirable angle that allows the cutting tool to easily transition between the pilot 14 and the segmented portion 18 of the orbital drill 10.

The finishing cutting portion 42 of the segmented portion 18 includes a plurality of segments or sections 42a, 42b and 42c separated by substantially V-shaped grooves 54a, 54b and 54c. The orbital drill 10 may include a radius 53 for transitioning between the section 42c and the clearance neck portion 26. Each section 42a, 42b and 42c of the finishing portion 42 has approximately the same diameter 46, which is different than the diameter 44 of the semi-finishing portion 40. The groove 54a separates the section 42a from the semi-finishing cutting portion 40, the groove 54b separates the section 42a from the section 42b, and the groove 54c separates the section 42b from the section 42c. Each groove 54a, 54b and 54c has a front wall 55, a rear wall 56 and a radius 57 therebetween. The rear wall 56 forms a cutting edge for the orbital drill 10.

In the illustrated embodiment, the front wall 55 and the rear wall 56 form an angle 58 of about ninety (90) degrees with respect to each other. However, the front wall 55 forms an angle 55a with respect to the axis 52 that is different than an angle 56a formed by the rear wall 56 with respect to the axis 52. Specifically, the angle 55a formed by the front wall 55 with respect to the axis 52 is larger than the angle 56a formed by the rear wall 56 with respect to the axis 52. It will be appreciated that the invention is not limited by the relative angle between the front wall 55 and the rear wall 56, and that the invention can be practice with any desirable angle depending on the application of the orbital drill 10.

The sections 42a, 42b and 42c of the segmented orbital drill 10 of the invention serve several different purposes. First, the sections 42a, 42b and 42c cause less contact with the workpiece 60, which reduces power consumption and minimizes deflection of the orbital drill 10. Second, the grooves 54a, 54b and 54c between the sections 42a, 42b and 42c allow a fresh cutting edge (i.e., rear wall 56) to be revealed as the orbital drill 10 wears in the axial direction (along the longitudinal axis 28), for example, at location 49 on the front edge of the semi-finishing cutting portion 40. Third, the fresh cutting edges are better suited for chip formation than the worn edges as the orbital drill 10 moves in the forward in the direction of the arrow 51 (FIG. 2) during a machining operation. Fourth, chipping or damage of a cutting edge (i.e., rear wall 56) of a preceding section, for example, section 42a, will not affect the other sections (42b and 42c) due to the grooves 54a, 54b and 54c that separate each section 42a, 42b and 42c. Fifth, the life of the orbital drill 10 is increased because damage that may progress along the grooves 54a, 54b and 54c is more controlled, as compared to conventional orbital drills.

Referring now to FIGS. 3(a)-(f), a method for machining a composite workpiece 60 having a metallic top layer 62, a middle layer 64 of CFRP material and a metallic bottom layer 66 will now be described. In FIGS. 3(a)-(f) the orbital drill 10 is shown as a solid and the workpiece 60 is shown in cross-section for clarity. It will be appreciated that the composite workpiece 60 that is machined by the orbital drill 10 is for illustrative purposes only, and the principles of the invention can be applied to machine workpieces with one or more layers of materials, which may or may not be different have different material properties.

FIG. 3(a) shows a cross-section of the tool orbit motion and represents a double drill illustrative of the extent of the full orbit of the orbital drill 10. FIGS. 3(b)-(g) illustrate the orbital drill 10 in the full left position in the hole 68 to be drilled. In FIG. 3(b), the orbital drill 10 is inserted into a pre-drilled hole 70 and uses an orbital drilling cycle (helical interpolation or circular) to begin drilling a hole 68 into the metallic top layer 62 with the semi-finishing cutting portion 40 of the orbital drill 10. At this point in the machining cycle, the central, longitudinal axis 28 of the orbital drill 10 is moved in a helical or circular direction about the central axis 72 of the hole 68. In other words, the central, longitudinal axis 28 of the orbital drill 10 is moved is a helical or circular motion by a total distance 74 about the central axis 68 of the hole 68. The hole 68 may be full diameter at the entrance only, or be completely finished to full diameter, or may have some finishing stock on the internal diameter (ID) of the hole 68.

In FIG. 3(c), the orbital drill 10 is moved in the direction of the arrow 51 such that both the semi-finishing cutting portion 40 and the finishing cutting portion 42 of the segmented portion 18 engages the metal layer 62, and the pilot 14 drilling a hole 76 in the middle layer 64 of CFRP material. Note that during this cycle, the removal of the layer 64 of CFRP material is accomplished by using only the pilot 14 of the orbital drill 10, and that the segmented portion 18 is not used at all. Thus, there is no wear of the segmented portion 18 of the orbital drill 10 during this cycle.

In FIG. 3(*d*), the orbital drill 10 has completed drilling of the top layer 62 and continues to drill the middle layer 64 using the pilot 14. In FIG. 3(*e*), both the segmented portion 18 and the pilot 14 of the orbital drill 10 continue to drill the middle layer 64 of the workpiece 60. Note that during the drilling operations shown in FIGS. 3(*d*) and 3(*e*), the pilot 14 of the orbital drill 10 is now acting as a "step drill" to drill a pilot hole for the segmented portion 18 of the orbital drill 10.

In FIG. 3(*f*), the segmented portion 18 of the orbital drill 10 has almost completely drilled through the middle layer 64 and the pilot 14 is no longer being used.

In FIG. 3(*g*), the orbital drill 10 is moved in the direction of the arrow to completely drill through the bottom layer 66 until the segmented portion 18 of the orbital drill 10 has completely drilled through the workpiece 60. As can be seen, the clearance neck portion 26 provides clearance between the orbital drill 10 and the workpiece 60. At this point, the orbital drilling operation has finished.

As described above, the segmented orbital drill 10 of the invention offers many distinct advantages when compared to conventional cutting tools. For example, the segmented orbital drill 10 allows for a fresh cutting edge (i.e., rear wall 56) to be revealed as the orbital drill 10 wears in the axial direction. In addition, the segmented orbital drill 10 causes less contact with the workpiece 60, which reduces power consumption and minimizes deflection of the orbital drill 10. Further, the life of the orbital drill 10 is increased because damage that may progress along the grooves 54*a*, 54*b* and 54*c* is more controlled, as compared to conventional orbital drills.

The patents and publications referred to herein are hereby incorporated by reference.

Having described presently preferred embodiments the invention may be otherwise embodied within the scope of the appended claims.

What is claimed is:

1. A segmented orbital drill, comprising:
   a segmented portion including a semi-finishing cutting portion and a plurality of finishing cutting portions, the semi-finishing cutting portion having a diameter that is different than a diameter of the plurality of finishing cutting portions;
   a clearance neck portion between the segmented portion and a shank;
   a pilot between the segmented portion and an end of the segmented orbital drill; and
   an undercut between the pilot and the segmented portion,
   wherein the pilot has a diameter smaller than the diameter of the segmented portion.

2. The segmented orbital drill of claim 1,
   wherein the semi-finishing cutting portion and the plurality of finishing cutting portions are separated by a substantially V-shaped groove formed by a front wall, a rear wall and a radius therebetween.

3. The segmented orbital drill of claim 1, wherein the rear wall and the front wall form an angle with respect to each other.

4. The segmented orbital drill of claim 3, wherein the angle is about ninety degrees.

5. The segmented orbital drill of claim 1, wherein an angle formed by the front wall with respect to an axis perpendicular to a central, longitudinal axis of the segmented orbital drill is greater than an angle formed by the rear wall with respect to the axis that is perpendicular to the central, longitudinal axis.

6. The segmented orbital drill of claim 1, wherein the diameter of the semi-finishing cutting portion is less than the diameter of the plurality of finishing cutting portions.

7. The segmented orbital drill of claim 1, further comprising a tapered surface between the undercut and the segmented portion.

* * * * *

UNITED STATES PATENT AND TRADEMARK OFFICE
CERTIFICATE OF CORRECTION

| | | |
|---|---|---|
| PATENT NO. | : 8,858,129 B2 | Page 1 of 1 |
| APPLICATION NO. | : 13/034139 | |
| DATED | : October 14, 2014 | |
| INVENTOR(S) | : Karen Anne Craig | |

It is certified that error appears in the above-identified patent and that said Letters Patent is hereby corrected as shown below:

IN THE SPECIFICATION

In Column 1, Line 60, delete "having having" and insert -- having --, therefor.

In Column 2, Line 43, delete "portion 22" and insert -- portion 26 --, therefor.

Signed and Sealed this
Thirty-first Day of March, 2015

Michelle K. Lee
*Director of the United States Patent and Trademark Office*